Figure 1:
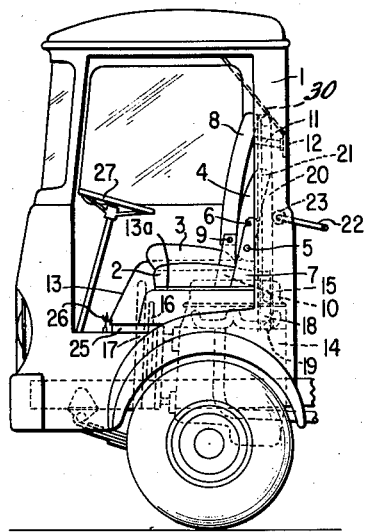

March 17, 1964 A. H. MÜLLER 3,125,179
SEAT CONSTRUCTION FOR MOTOR VEHICLES
Filed Sept. 14, 1961

INVENTOR.
ALFRED H. MÜLLER
BY Dicke and Craig
ATTORNEYS.

3,125,179
SEAT CONSTRUCTION FOR MOTOR VEHICLES
Alfred H. Müller, Waiblingen, Germany, assignor to Daimler-Benz Aktiengesellschaft, Stuttgart-Unterturkheim, Germany
Filed Sept. 14, 1961, Ser. No. 138,153
Claims priority, application Germany Sept. 16, 1960
7 Claims. (Cl. 180—89)

The present invention relates to motor vehicles, especially trucks and busses provided with a vehicle drive arrangement below the driver seat, and more particularly relates to an arrangement for vehicles of the type mentioned hereinabove which facilitates the accessibility to the drive arrangement disposed below the driver seat.

In motor vehicles provided with a vehicle drive arrangement disposed below the front seats or below the driver cab, there exists the disadvantage that the drive is ordinarily accessible only in a rather difficult manner. It has, therefore, already been proposed to support the entire driver cab in a pivotal manner about its lower forward edge so that the cab together with the seats and the steering can be tilted forwardly through an angle of approximately 60 degrees in order to lay open the vehicle drive and therewith to render the same accessible. Aside from the structural complications of the steering connected therewith, there exists the disadvantage in such prior art constructions that the rear section of the driver cab frees only slightly the space above the vehicle drive. Additionally, the rear ends of the fender body panels or similar structural parts lifted up together with the driver cab project therefrom relatively far in the downward direction and represent a constant danger for accidents to the persons that work on the drive.

The present invention eliminates these disadvantages and essentially consists in supporting and guiding the seat of the driver and of the companion driver seated alongside the driver together with the back rests thereof in such a manner, especially in a manner as to be movable in the vertical direction, that they may be lifted up to the roof of the vehicle or driver cab and may be retained thereat in the folded-together condition. For that purpose, the seats of the driver and companion drivers seated next to the driver or also a seating bench are arranged on a hood disposed over the vehicle drive which hood opens up or lays bare during lifting thereof a floor aperture. The lifting of the seats may take place by means of a crank and a cable-hoist-like or chain-hoist-like drive, by means of a feed spindle drive or also by appropriate conventional hydraulic or pneumatic means. In order to lay open the floor aperture and therewith render accessible the vehicle drive, it is only necessary to crank up the floor hood. The aperture is disposed protected against the elements, the seats cannot be soiled, and the danger of accident as a result of projecting structural parts no longer exists. Additionally, the simplicity of the steering is also maintained. At most, it may be necessary to remove the steering wheel prior to lifting of the seats in case the steering wheel is in their way. There exists for trucks with a vehicle body disposed behind the driver cab, in contrast to the vehicles with a forwardly tiltable driver cab, the advantage that the vehicle body may be extended continuously in the forward direction up to the driver cab and may be combined structurally therewith.

Accordingly, it is an object of the present invention to provide a motor vehicle construction having a drive arrangement disposed below the driver seat which effectively eliminates the inadequacies and short-comings encountered with the known prior art constructions of this type.

Another object of the present invention resides in the provision of a motor vehicle construction provided with a drive unit disposed below the driver seat and the seats for the passengers or companion drivers seated alongside the driver which permits, by simple means, a good, danger-free accessibility to the drive unit disposed below these seats.

A still further object of the present invention resides in the provision of a motor vehicle construction especially for trucks or the like having a driver cab containing the driver and passenger seat means and having a drive unit disposed below these seat means which disposes of the necessity of rendering the driver cab tiltable about the forward edge thereof and therewith permits a structural combination of the body parts and/or frame parts forming the loading platform and associated vehicle parts with the body frame parts forming the driver cab.

Still a further object of the present invention resides in the provision of a seating arrangement for a motor vehicle below which there is arranged the drive unit for the vehicle which permits lifting of these seats within the vehicle to enable ready access to the drive unit and which protects the seats against soiling by dirt thrown up from the road through the aperture through which the drive unit can be rendered accessible.

These and other objects, features and advantages of the present invention will become more obvious from the following description when taken in connection with the accompanying drawing which shows, for purposes of illustration only, one embodiment in accordance with the present invention, and wherein—

Figure 3:
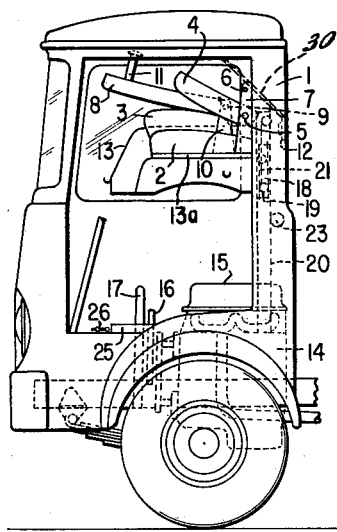
Figure 2:
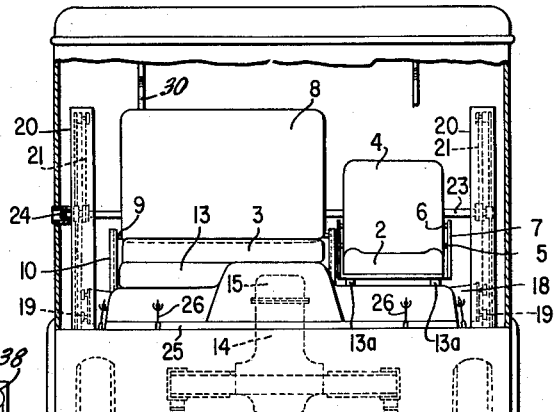
Figure 4:
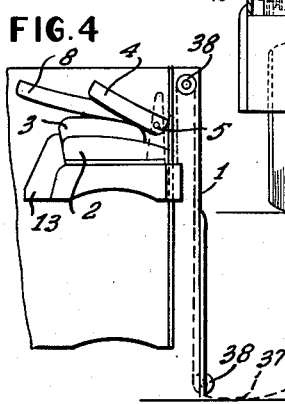

FIGURE 1 is a side elevational view of the driver cab of a truck-type motor vehicle with the seating arrangement thereof in the position for normal use, the side door being omitted for clarity's sake, FIGURE 2 is a front elevational view of the seating arrangement of FIGURE 1, FIGURE 3 is a side elevational view of the driver cab similar to FIGURE 1 with the seats shown in the raised position thereof, and FIGURE 4 is a schematic view of a modification of the present invention.

Referring now to the drawing wherein like reference numerals are used throughout the various views to designate like parts, reference numeral 1 designates therein a driver cab forming part, for example, of a truck-type motor vehicle. An individual driver seat 2 for the driver and a seating bench 3 arranged adjacent thereto for two companion drivers or passengers are arranged within the driver cab 1. The back-rest 4 of the driver seat 2 is pivotally supported about a joint 5 and engages by means of two lateral bearing journals 6 in corresponding apertures of two support brackets 7 (FIGURE 1). In a similar manner, the seat-bench back-rest 9 may be swung about bearing journals 9 of lateral support brackets 10. In the normal position of use, the back-rest 8 abuts by means of rear supports 11 against abutments 12 provided at the rear wall of the cab.

The seats 2 and 3 together with the fixtures 7 and 10 for the pivotal back-rest connection are secured on a hood-shaped floor member 13 of the driver cab 1 either directly or also, for example, horizontally displaceable and adjustable slide rails 13a (FIGURE 2). The hood-shaped member 13 is of such height within the area of the driving engine 14 arranged below the seats that it covers with sufficient distance the cylinder head 15 inclusive the radiator fan 16 and cooling-liquid radiator 17. Two rearwardly disposed brackets or supports 18 extend laterally from the hood-shaped member 13. These brackets 18 run by means of rollers 19 within vertical rails 20 extending upwardly from the floor of the driver cab 1. There is additionally provided at these vertical rails 20 a cable-hoist-like or chain-hoist-like drive mechanism 21 the free ends of which engage at the hood brackets 18.

The chain or cable system is actuated by means of a hand crank 22 (FIGURE 1) which is placed over a chain-roller spindle 23 (FIGURE 2). The spindle 23 extends through the driver cab 1 almost over the entire width thereof and is also supported at the rails 20. The emplacement end 24 for the hand crank 22 is accessible from the outside.

The hood-shaped floor member 13 extends practically also over the entire width of the driver cab 1 and rests with the lower rim thereof on a rim rubber edge 25 of the floor aperture of the driving cab 1 covered by the hood-shaped member 13. The hood-shaped member 13 is drawn tightly over the rubber bearing 25 by means of resilient clamping or toggle means 26 or other suitable tightening means of any conventional construction.

*Operation*

The manipulation and operation of the arrangement described and illustrated herein is as follows:

If it is desired to render accessible the vehicle drive, then at first the back-rests 4 and 8 are folded manually over the seat cushions 2 and 3, thereupon the securing means 26 for the hood-shaped member 13 are released, and thereafter the hood-shaped member 13 together with the seats 2 and 3 are cranked upwardly out of the position of FIGURE 1 into the position thereof illustrated in FIGURE 3, after the steering wheel 27 (FIGURE 1) has been removed prior thereto in case this would be necessary.

While I have shown and described one embodiment in accordance with the present invention, it is understood that the same is not limited thereto but is susceptible of many changes and modifications. For example, instead of the cable-hoist or chain-hoist drive for lifting the seating arrangement, a spindle drive or possibly a lifting mechanism consisting, for example, of a pressure-medium actuated lifting means as schematically illustrated in FIGURE 4 may be provided for selectively raising and lowering the hood-shaped member 13. Additionally, the back-rests 4 and 8 of the seats 2 and 3 may be provided with separate means which automatically fold the back-rests 4 and 8 during the upward movement of the hood-shaped member 13 and which erect the back-rests 4 and 8 during lowering of the seats. Such auxiliary means may be in the form of any conventional actuating mechanism by appropriate guide means such as guide element 30 of FIGURE 1, or the like.

Thus, it is obvious that the present invention is susceptible of many changes and modifications within the spirit and scope thereof, and I, therefore, do not wish to be limited to the details shown and described herein, but intend to cover all such changes and modifications as are encompassed by the scope of the appended claims.

I claim:

1. In a motor vehicle, such as a truck, provided with vehicle drive means arranged below the seat assembly for at least one of the driver and passenger seated alongside of the driver and with a cab surrounding said seat assembly including roof means and a floor, the combination of said seat assembly, said seat assembly comprising seat means, backrest means, pivot means for attaching said backrest means to said seat means to enable said backrest means to be pivoted downwardly onto said seat means, the floor of the vehicle below said seat assembly being provided with an aperture to enable access therethrough to said drive means, and liftable hood-shaped means supporting thereon said seat means and normally closing said aperture, the rim of said aperture being provided with sealing abutment means for the lower edge of said hood-shaped means, means for vertically lifting said seat assembly in an essentially horizontal plane to within proximity of said roof means to thereby enable access to said drive means through said aperture and for maintaining said assembly in the raised position thereof, and guiding means for said seat assembly comprising a pair of vertically extending guide rails secured adjacent the respective ends of said seat means and means for maintaining said seat assembly in its horizontal position guidingly securing said seat assembly to said rails, whereby during vertical movement of said seat assembly, said assembly remains in its horizontal position.

2. An apparatus as defined in claim 1, further including elastic clamping means for tightening the lower edge of said hood-shaped means against said abutment means.

3. An apparatus as defined in claim 1, further including means for automatically pivoting said backrest means over the seat means during said vertical lifting of the seat assembly.

4. In a motor vehicle, such as a truck, provided with vehicle drive means arranged below the seat assembly for at least one of the driver and passenger seated alongside of the driver and with a cab surrounding said seat assembly including roof means and a floor, the combination of said seat assembly, said seat assembly comprising seat means, backrest means, pivot means for attaching said backrest means to said seat means to enable said backrest means to be pivoted downwardly onto said seat means, the floor of the vehicle below said seat assembly being provided with an aperture to enable access therethrough to said drive means, and liftable hood-shaped means supporting thereon said seat means and normally closing said aperture, the rim of said aperture being provided with sealing abutment means for the lower edge of said hood-shaped means, means for vertically lifting said seat assembly in an essentially horizontal plane to within proximity of said roof means to thereby enable access to said drive means through said aperture, and guiding means for said seat assembly comprising a pair of vertically supported guide rails secured adjacent the respective ends of said seat means, a bracket secured to each end of said hood-shaped means, and means arranged within each of said guide rails and secured to the respective bracket for maintaining said hood-shaped means in a horizontal position during lifting of said seat assembly.

5. An apparatus as defined in claim 4, wherein each of said means arranged within the guide rails comprises a pair of rollers arranged within the respective guide rail and secured to a respective bracket.

6. An apparatus as defined in claim 4, wherein said lifting means is a manual crank-actuated hoist means including a spindle rotatably supported by said rails adjacent the rear of said cab, said spindle including a hand crank and a chain-like means operatively connecting each said bracket to said spindle for vertical lifting of said seat assembly.

7. An apparatus as defined in claim 4, wherein said lifting means is a pressure-medium actuated lifting means.

References Cited in the file of this patent

UNITED STATES PATENTS

| | | |
|---|---|---|
| 2,064,100 | Bachman | Dec. 15, 1936 |
| 2,104,335 | Stahl | Jan. 4, 1938 |
| 2,426,772 | Holan et al. | Sept. 2, 1947 |
| 2,798,568 | Zeller | July 9, 1957 |
| 2,848,273 | Diaz | Aug. 19, 1958 |
| 2,857,977 | Bock | Oct. 28, 1958 |
| 3,011,581 | Wood | Dec. 5, 1961 |